United States Patent
Meguro

[11] Patent Number: 6,077,604
[45] Date of Patent: Jun. 20, 2000

[54] SEALING TAPE

[75] Inventor: Kitoshi Meguro, Ibaraki, Japan

[73] Assignee: Meguro Chemical Industry Co., Ltd., Ibaraki, Japan

[21] Appl. No.: 08/832,365

[22] Filed: Apr. 2, 1997

[30] Foreign Application Priority Data

Apr. 2, 1996 [JP] Japan .................................... 8-079888
Nov. 1, 1996 [JP] Japan .................................... 8-291966

[51] Int. Cl.$^7$ ...................................................... C09J 7/02
[52] U.S. Cl. .................................. 428/343; 428/355 BL; 428/356
[58] Field of Search .............................. 428/343, 355 BL, 428/356

[56] References Cited

U.S. PATENT DOCUMENTS 3,434,903  3/1969  Hann .
4,299,874  11/1981  Jones .
4,404,056  9/1983  Kakehi .
4,421,807  12/1983  Clausing .
4,440,829  4/1984  Gerace .
4,671,996  6/1987  Cantor .

FOREIGN PATENT DOCUMENTS 3004875  9/1994  Japan .

*Primary Examiner*—Jenna Davis
*Attorney, Agent, or Firm*—Jacobson, Price, Holman & Stern, PLLC

[57] ABSTRACT

The tape is free from any slack and separation even when it is applied and bonded to a metal joint portion while being bent. The tape, made of an unvulcanized material containing an unvulcanized rubber-base material, a vulcanization accelerator, an anti-oxidizing agent, a pigment and a bulk filler, is formed into an elongated shape having an upper and a lower surface and a predetermined thickness measured in a direction perpendicular to the lower surface or flat bottom surface 1. The upper surface forms a circularly-curved surface 2 in cross section. Since the tape is in an unvulcanized state, it is capable of being free bent when applied to the metal joint portion. After application of the tape to the metal joint portion, a paint is applied to the tape, which is followed by a heating process in which the tape is heated, and, therefore vulcanized.

4 Claims, 7 Drawing Sheets

SEALING TAPE

BACKGROUND OF THE INVENTION

1. Field of the Invention

The present invention relates to a sealing tape and a method and apparatus for its production, and a method of repairs with it, and more particularly to a sealing tape for covering, in a car body, an exposed metal surface, a joint between metal plates, a shoulder portion in joint, and like stepped portions.

2. Description of the Prior Art

In the manufacture of automobiles, it has been the practice to apply a sealing agent to joint portions and joint shoulder portions in car bodies such as body panel joints and hemming portions in door and hoods of the car bodies to prevent water and dust from entering the car bodies. More specifically, as shown in FIG. 15, in case that an inner metal plate B is inserted into and jointed to a bent portion C of an outer metal plate "A" which is provided with the bent portion C in its end portion, a joint shoulder portion D extending in a direction perpendicular to the plane of the drawing paper is covered with a strip of sealing agent E having been squeezed out of a tube through its nozzle, so that the thus sealed joint shoulder portion D extends in the direction perpendicular to the drawing paper.

The application of this sealing agent E to the car body is carried out by an industrial robot during the manufacture of the car or automobile. Consequently, it is possible to control, with high accuracy, both the amount of the sealing agent E being squeezed out through the nozzle and a traveling distance of the nozzle, which enables the sealing agent E having been applied to the car body to assume a constant shape in cross section, as shown in FIG. 14. The application of the sealing agent E to the car body is followed by the application of paint.

When the joint of car body panels is deformed by an impact applied to the car, it is necessary to repair such deformed joint so as to have the joint return to its original shape in appearance.

In such repairing and paint application of the car body, after completing the repair in shape of the joint of the car body panels, the sealing agent E is applied to the joint in a manner such that: the nozzle of the tube, which is made of, for example, metal and filled with the sealing agent E, is manually brought into direct contact with a joint of the car body by an auto worker; and, the sealing agent E is also manually squeezed out of the tube through the nozzle thereof while the nozzle of the tube is manually moved along the course of the joint by the worker, whereby the application of the sealing agent E to the course of the joint is manually carried out by the worker.

In such manual operations, it is very difficult for the worker to keep constant the amount of the sealing agent E applied to the course of the joint even when he concentrates his attention on his work in which he must constantly squeeze the sealing agent E out of the tube as he moves the tube along the course of the joint. In other words, in most cases, the worker fails to accurately trace the course of the joint, which results in an uneven finishing surface of the sealing agent E thus applied to the joint. Due to this failure, the joint of the body panels thus repaired fails to assume the same shape as that of a joint of body panels in a new car. The shape of the joint in a new car is shown in FIG. 15 in cross section.

Previous to the present invention, the inventor of the subject application has already proposed a conventional sealing tape 10. This sealing tape 10 enables a user to seal the joint of car body panels with it in a very easy manner, and the joint thus sealed with the tape 10 is excellent in finishing.

As shown in FIG. 14, the conventional sealing tape 10 assumes an relatively thick strip-like shape with a stepped bottom surface, and is made of vulcanized rubber material to resiliently keep its original shape. In use, such conventional sealing tape 10 is adhesively applied to a joint shoulder portion of metal plates (See, Japanese Utility Model Registration No. 3,004,875).

For example, as shown in FIG. 13, in application of the conventional sealing tape 10 assuming the above shape to the joint shoulder portion D located between the outer or first metal plate "A" and the inner or second metal plate B which is inserted into and jointed to the bent portion C of the first metal plate "A" which is provided with the bent portion C in its end portion, the sealing tape 10 has its first bottom surface portion 11, which is opposite to a curved portion 14 of the tape 10, and its second bottom surface portion 12, which is opposite to a flange edge portion 15 of the tape 10, adhesively applied to the metal plates "A" and B, respectively.

As a result, both the first bottom surface portion 11 and the second bottom surface portion 12 of the conventional sealing tape 10 may firmly adhere to the joint shoulder portion D located between the metal plates "A" and B, which ensures that the joint shoulder portion D is sufficiently sealed up.

However, for example, as shown in FIG. 12, when the conventional sealing tape 10 is used in a joint shoulder portion of metal plates of an inner side of a car rear door (an upholstery lining panel of which is removed in FIG. 12), it is necessary to bend the sealing tape 10 at substantially right angles in a manner such that the sealing tape 10 extends along a corner portion G of the door to adhere to the corner portion G.

In this case, the sealing tape 10 often slacks in or separate from the corner portion G of the door, which impairs the door in its surface finish quality. In order to improve the door in such surface finish quality, it is necessary to manually apply the sealing agent E to this corner portion G of the door as is in the conventional application.

The above-mentioned slacking and separation of the sealing tape 10 occurs because of its resiliency. In other words, since the sealing tape 10 is made of rubber material having been vulcanized and assumes a strip-like or elongated shape with resiliency, such slacking and separation occurs in the corner portion G of the door. In general, rubber material is vulcanized to assume a fixed shape of a desired rubber product, because rubber material not vulcanized may vary in shape under pressure. Consequently, such rubber material not vulcanized is not adequate for the purpose of the sealing tape which must keep its shape for a long period of time in use.

SUMMARY OF THE INVENTION

Under such circumstances, the present invention was made on the basis of the fact that the application of paint in car repairs is accompanied with a heating process. Consequently, it is an object of the present invention to provide a sealing tape and a method and apparatus for its production, and a method of repairs with the sealing tape which is an unvulcanized tape, and, therefore capable of freely varying in shape when required to bend, the method of repairs using the heating process to vulcanize this sealing tape.

According to a first aspect of the present invention, the above object of the present invention is accomplished by providing:

A sealing tape made of a sealing-tape material containing an unvulcanized rubber-base material and its vulcanization accelerator, the sealing tape assuming an elongated shape with a bottom surface and a predetermined thickness measured in a direction perpendicular to the bottom surface.

Since the sealing tape of the present invention is in an unvulcanized state, it is capable of being freely deformed. Consequently, even when the sealing tape of the present invention is bent into a desired shape, there no fear that the tape slacks and separates from a portion to which the tape is applied.

According to a second aspect of the present invention, the above object of the present invention is accomplished by providing:

The sealing tape as set forth in the first aspect of the present invention, wherein:

added to the unvulcanized rubber-base material together with the vulcanization accelerator is an anti-oxidizing agent.

The anti-oxidizing agent is capable of improving the sealing tape of the present invention in weatherability.

An adhesive may be applied to the bottom surface of the sealing tape, the unvulcanized state of which tape makes it possible to apply the adhesive to the bottom surface of the sealing tape.

According to a third aspect of the present invention, the above object of the present invention is accomplished by providing:

The sealing tape as set forth in the first aspect of the present invention, wherein:

the bottom surface is a stepped surface which enables the sealing tape to be brought into close- or hermetic-contact with a stepped joint or shoulder portion of metal plates.

According to a fourth aspect of the present invention, the above object of the present invention is accomplished by providing:

A method for producing a sealing tape, comprising:

a sealing-tape material preparing step for preparing a sealing-tape material containing an unvulcanized rubber-base material and its vulcanization accelerator;

a sealing-tape forming step in which the sealing-tape material is formed into a substantially square-shaped sheet while keeping its unvulcanized condition;

an adhesive applying step for applying an adhesive sheet to a bottom of the substantially square-shaped sheet, the adhesive sheet being coated with an adhesive; and a substantially square-shaped sheet cutting step for cutting the substantially square-shaped sheet into at least one of the sealing tapes each of which assumes an elongated shape having a bottom surface and a predetermined thickness measured in a direction perpendicular to the bottom surface of the sealing tape, wherein the substantially square-shaped sheet is moved while having its upper surface brought into press-contact with a roll-type cutter provided with at least a pair of circular blades axially spaced apart from each other through an annular concave portion formed in a peripheral portion of the roll-type cutter.

In this method for producing the sealing tape, the annular concave portion of the roll-type cutter may be a circularly-curved shape in cross section which is adapted for being used.

Further, in the method for producing the sealing tape, an anti-oxidizing agent may be added in the sealing-tape material preparing step. The anti-oxidizing agent is capable of improving the unvulcanized sealing tape in weatherability.

According to a fifth aspect of the present invention, the above object of the present invention is accomplished by providing:

A method of repairs with a sealing tape, comprising the steps of:

applying the sealing tape to a joint between a pair of metal surfaces or metal plates to bond the sealing tape to the joint while bending the sealing tape, wherein the sealing tape is made of a sealing-tape material containing an unvulcanized rubber-base material and its vulcanization accelerator, the sealing tape assuming an elongated shape with a bottom surface and a predetermined thickness measured in a direction perpendicular to the bottom surface; and applying, in a painting process, a paint to an upper surface of the sealing tape thus bent and bonded to the joint, wherein the paint is subjected to a heating process in which the sealing tape thus bent and bonded is vulcanized to become a final rubber product with a fixed resilient shape thus bent and bonded.

In this method of repairs with the sealing tape, the sealing tape has its bottom surface bonded to the joint of the metal surfaces, which is followed by the the painting process accompanied with the heating process for vulcanizing the sealing tape. Consequently, the sealing tape subjected to the hearing process is vulcanized to become a final rubber product assuming a fixed resilient shape thus bent and bonded, which enables the sealing tape thus vulcanized to resiliently keep its final shape.

BRIEF DESCRIPTION OF THE DRAWINGS

FIG. 10($b$) is a schematic diagram illustrating a lengthwise trimming step for trimming lengthwise the opposite corner portion, in cross section, of an upper surface of the sealing tape by means of a roll-type grinding means;

DESCRIPTION OF THE PREFERRED EMBODIMENTS

Hereinbelow, the present invention will be described in detail with reference to the accompanying drawings.

Figure 1:
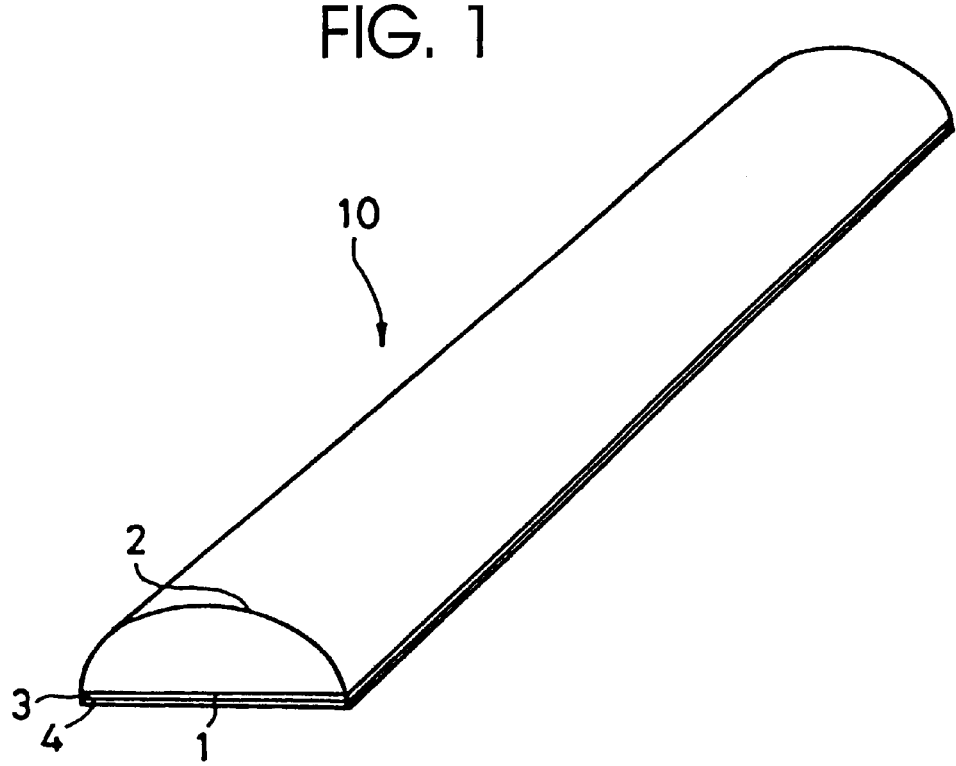
FIG. 1 is a perspective view of an embodiment of the sealing tape of the present invention.
Figure 15:
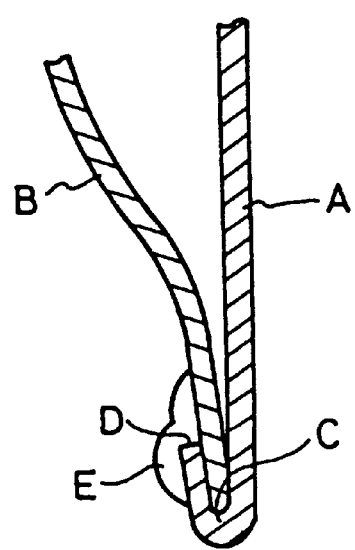
FIG. 15 is a cross-sectional view of the joint shoulder portion of the metal plates, to which portion a sealing agent has been applied.

FIG. 1 shows a perspective view of a first embodiment of a sealing tape 10 of the present invention. The sealing tape 10 is made of a sealing-tape material which contains an unvulcanized rubber-base material, a vulcanization accelerator thereof, an anti-oxidizing agent, a pigment and a bulk filler. The sealing tape 10 assumes an elongated shape with an upper and a lower surface. The lower surface forms a flat bottom surface 1, while the upper surface forms a circularly-curved surface 2. The sealing tape 10 has a predetermined thickness measured in a direction perpendicular to the bottom surface 1, and is in an unvulcanized state.

Applied to the bottom surface 1 of the sealing tape 10 is an adhesive layer 3 which is covered with a protective tape 4 to keep the sealing tape 10 in an unvulcanized state or condition which enables the adhesive layer 3 to be firmly bonded to the bottom surface 1 of the sealing tape 10. At this time, the surface roughness in the bottom surface 1 of the sealing tape 10, which is in the unvulcanized state or condition, facilitates the application of the adhesive layer 3 to the bottom surface 1. Consequently, in the present invention, it is possible to eliminate a cumbersome application working of a double-faced adhesive tape to the bottom surface 1 of the sealing tape 10, which reduces the manufacturing cost. However, in the present invention, it is also possible to use such conventional double-faced adhesive tape in place of the adhesive 3 layer described above.

The protective tape 4 covering the adhesive layer 3 enables the sealing tape 10 to be wound into a roll for convenience of storage.

On the other hand, the vulcanization accelerator, for example such as sulfur oxides and the like, functions to vulcanize the unvulcanized rubber-base material under the influence of heat generated in a heating process. Due to the thus vulcanized rubber-base material, the sealing tape becomes to a final resilient rubber product assuming a fixed resilient shape. The present invention is characterized in that such vulcanization of the sealing tape 10 is carried out in the heating process accompanied with a painting process. The sealing tape 10 is in an unvulcanized state or condition before it is applied to the metal surfaces.

The anti-oxidizing agent, for example such as polybutene and the like, is added to the sealing-tape material to improve the sealing tape in weatherability.

The pigment, for example such as titanium oxides and the like, is used to pigment the sealing tape 10 with a desired color.

The bulk filler, for example such as calcium carbonate and the like, is used to swell the sealing-tape material therewith.

Further, the bulk filler functions to increase the sealing-tape material in strength.

The sealing tape 10 of the present invention is used to cover a joint portion of metal plates. More particularly, in the joint portion formed between adjacent edge portions of the metal plates, the sealing tape 10 is bonded to one of the adjacent edge portions of the metal plates to extend along the edge portion, whereby water and dust are prevented from entering through the other of the adjacent edge portions of the metal plates in the joint portion.

Figure 14:
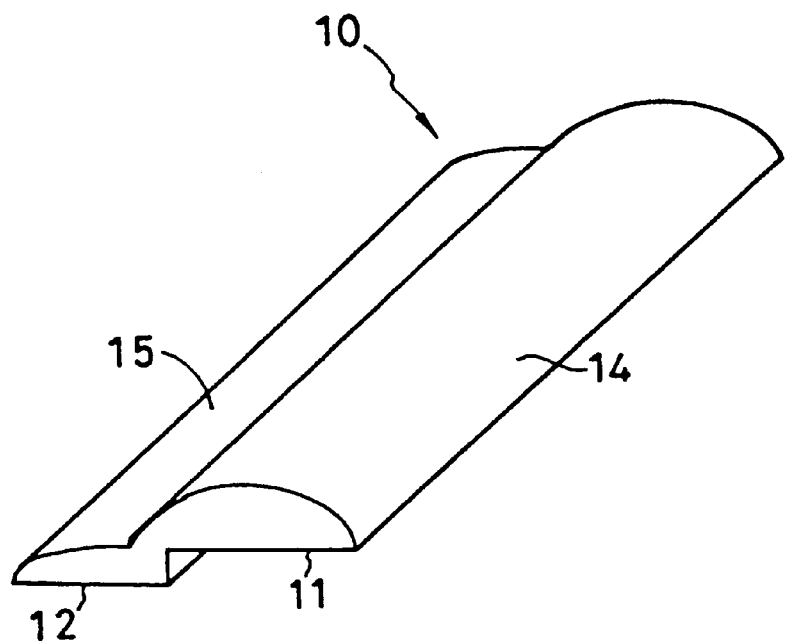
FIG. 14 is a perspective view of a conventional sealing tape.

On the other hand, as for the sealing tape 10 of the present invention which is in the unvulcanized state or condition described above, due to its properties, it is not possible to produce the sealing tape 10 in the same method as that used in production of a conventional vulcanized sealing tape shown in FIG. 14. In other words, in a conventional method for producing the conventional vulcanized sealing tape, a vulcanized rubber-base material, which has been already heated to a predetermined elevated temperature and therefore is capable of being molded, is filled in a cylinder having its bottom opening be equal in cross-sectional shape to the conventional vulcanized elongated sealing tape, and then extracted from the cylinder by means of a piston to assume an elongated shape of a final vulcanized rubber product, i.e., conventional sealing tape.

However, when the unvulcanized rubber-base material is used and extracted from the cylinder in the conventional method described above, it is not possible for the unvulcanized rubber-base material to assume a fixed shape as defined by the bottom opening of the cylinder, which makes it impossible to produce an elongated unvulcanized sealing tape.

Figure 2:
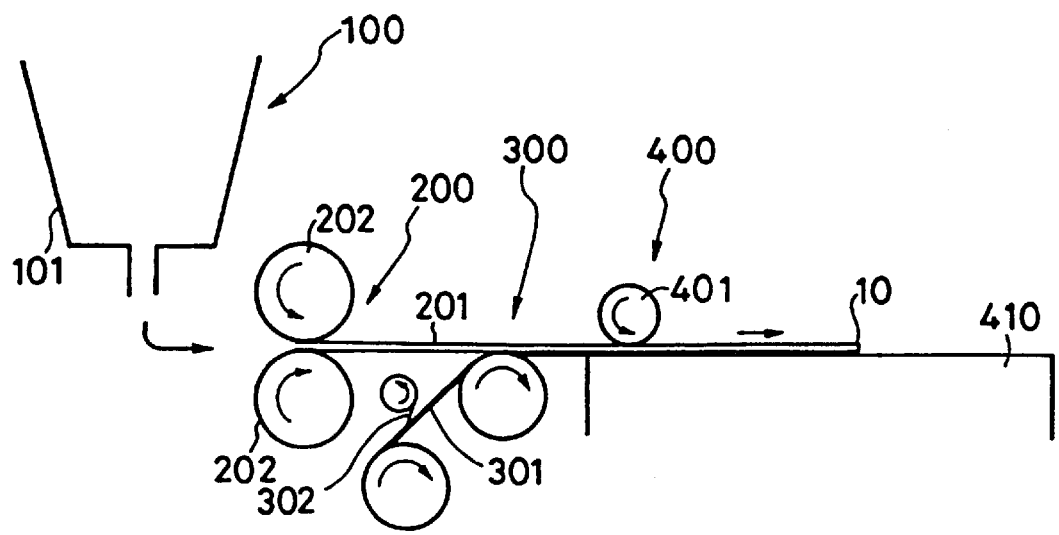
FIG. 2 is a schematic diagram of an embodiment of an apparatus of the present invention for carrying out an embodiment of the method of the present invention for producing the sealing tape shown in FIG. 1.

In contrast with the above conventional method, in the method of the present invention for producing the elongated unvulcanized sealing tape, as shown in FIG. 2, a plurality of the following process steps are used:

A sealing-tape material preparing step 100 for preparing a sealing-tape material containing an unvulcanized rubber-base material and its vulcanization accelerator together with an anti-oxidizing agent, a pigment and a bulk filler;

A sealing-tape forming step 200 in which the sealing-tape material is formed into a substantially square-shaped sheet 201 while keeping its unvulcanized condition;

An adhesive applying step 300 for applying an adhesive to a bottom of the substantially square-shaped sheet 201 through an adhesive sheet 301; and A substantially square-shaped sheet cutting step 400 for cutting the substantially square-shaped sheet 201 backed with the adhesive or adhesive sheet 301 into at least one of the sealing tapes 10 each of which assumes an elongated shape having a bottom surface 1 and a predetermined thickness measured in a direction perpendicular to the bottom surface 1 of the sealing tape 10, wherein the substantially square-shaped sheet 201 is moved while having its upper surface brought into press-contact with a roll-type cutter 401 which is provided with at least a pair of circular blades 402 axially spaced apart from each other through an annular groove or concave portion 403 formed in a peripheral portion of the roll-type cutter 401.

In the sealing-tape material preparing step 100, the unvulcanized rubber-base material and its vulcanization accelerator together with the anti-oxidizing agent, pigment and the bulk filler are loaded into a hopper 101 and mixed therein to prepare the sealing-tape material having a temperature of approximately 50 degrees centigrade.

In the sealing-tape forming step 200, the thus prepared sealing-tape material is formed into the substantially square-shaped sheet 201 while keeping its unvulcanized state or condition. More, particularly, the sealing-tape material supplied from the hopper 101 is squeezed between a pair of squeeze rolls 202 to become the substantially square-shaped sheet 201.

In this case, the unvulcanized state or condition of the sealing-tape material enables the sealing-tape material to be capable of being molded into a desired shape. Incidentally, the sealing-tape material in a semi-vulcanized state or condition may be used in the method of the present invention.

The substantially square-shaped sheet 201 has a flat bottom surface which may be slightly circularly curved in a direction perpendicular to the traveling direction of the sheet 201.

In the adhesive applying step 300, the adhesive is applied to the bottom surface of the substantially square-shaped sheet 201 through the adhesive sheet 301. More particularly, prior to the adhesive applying step 300, the adhesive is applied to opposite surfaces of an adhesive sheet 301. Thereafter, a protective tape 302 is applied to each of the opposite surfaces of the adhesive sheet 301 which is then wound into a roll. In the adhesive applying step 300, one of the protective sheets 302, which is oppositely disposed from the bottom surface of the square-shaped sheet 201 and applied to the adhesive sheet 301, is peeled off from the roll or wound adhesive sheet 301 when the sheet 301 is applied to the bottom surface of the square-shaped sheet 201, whereby the adhesive sheet 301 is bonded to the bottom surface of the square-shaped sheet 201, as shown in FIG. 2. The application of the adhesive sheet 301 to the square-shaped sheet 201 should be carried out immediately after completion of the sealing-tape forming step 200. The adhesive sheet 301 thus bonded to the bottom surface of the square-shaped sheet 201 functions to keep the shape of the sheet 201 constant, which enables the sheet 201 to be wound into a roll for storage.

Figure 3:
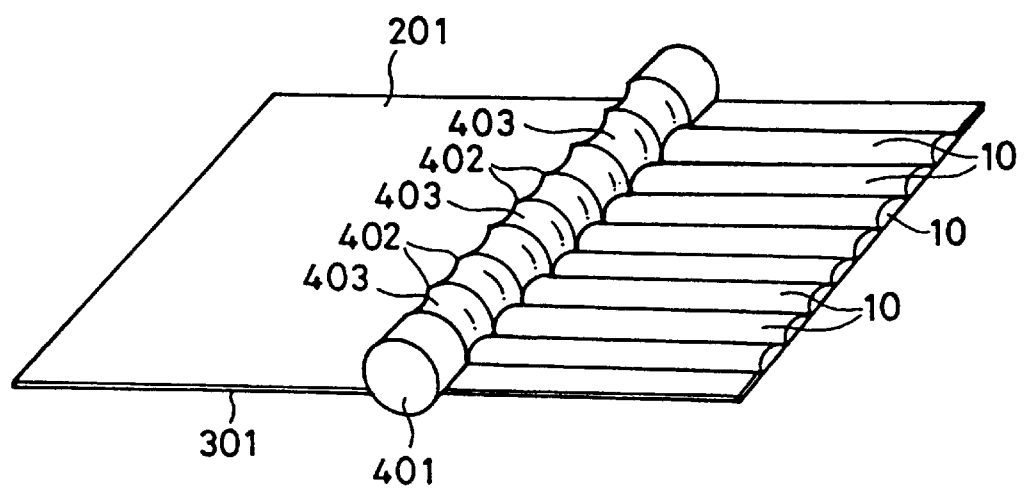
FIG. 3 is a perspective view of the roll-type cutter for cutting the square-shaped sheet in the method of the present invention for producing the sealing tape shown in FIG. 1.
Figure 4:
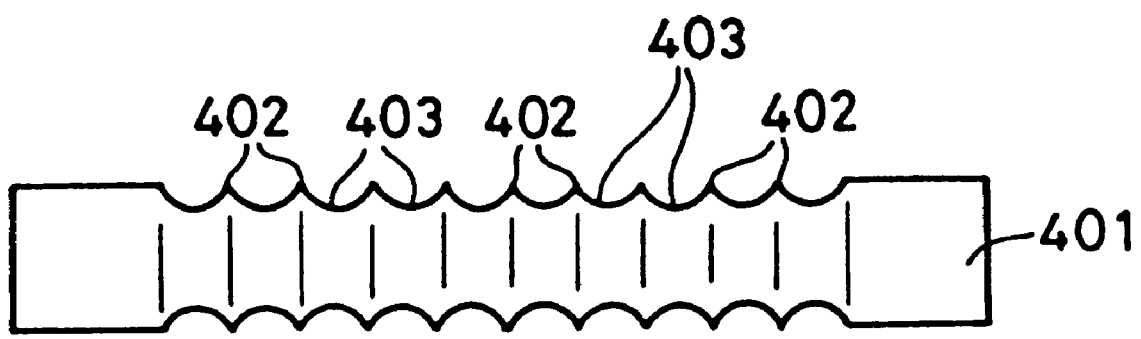
FIG. 4 is a side view of the roll-type cutter used in the method of the present invention illustrated in FIG. 2.

In the square-shaped sheet cutting step 400, as shown in FIGS. 2 and 3, the square-shaped sheet 201 travels along a stand 410 in a condition in which the sheet 201 has its upper surface brought into press-contact with the roll-type cutter 401 which is rotatably driven counterclockwise as viewed in FIG. 2, so that the square-shaped sheet 201 is cut into a plurality of the sealing tapes 10 of the present invention at a time. In other words, as shown in FIG. 4, since the roll-type cutter 401 is provided with a plurality of circular blades 402 axially spaced apart from each other through the annular groove or concave portion 403 formed in the peripheral portion of the cutter 401, the substantially square-shaped sheet 201 is cut into the plurality of sealing tapes 10 each of which assumes an elongated shape having the bottom surface 1 and a predetermined thickness measured in a direction perpendicular to the bottom surface 1 of the sealing tape 10.

The bottom surface 1 of the sealing tape 10 is flat, and may be slightly circularly curved in a direction perpendicular to a longitudinal axis of the elongated sealing tape 10.

Figure 5:
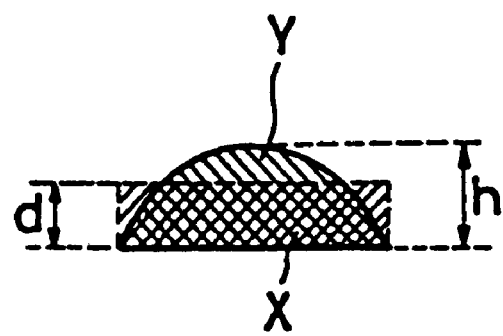
FIG. 5 is a cross-sectional view of the sealing tape shown in FIG. 1, illustrating a forming process of the sealing tape conducted in the substantially square-shaped sheet cutting step of the method of the present invention shown in FIG. 2.

A maximum depth h of the annular concave portion 403 of the roll-type cutter 401 is larger than the thickness d of the square-shaped sheet 201, as shown in FIG. 5. Consequently, when the square-shaped sheet 201 is squeezed and cut into the sealing tapes 10 by the roll-type cutter 401, upper opposite corner portions of each of pieces X (shown in cross section in FIG. 5) of the square-shaped sheet 201 are squeezed to form an upper circularly curved portion of a barrel-roof type form Y (shown in cross section in FIG. 5) of the sealing tape 10. In practice, the upper circularly curved portion of the barrel-roof type form Y is slightly larger in cross-sectional area than the piece X of the square-shaped sheet 201, which prevents the sealing-tape material from overflowing the annular concave portion 403.

As described above, in the method of the present invention, the square-shaped sheet 201 travels from the left to the right (as viewed in FIG. 2), and squeezed and cut into the plurality of the unvulcanized sealing tapes 10 by means of the roll-type cutter 401.

In the above embodiment of the present invention, although the annular concave portion 403 of the roll-type cutter 401 assumes the circularly curved shape in cross section as is clear from FIG. 4, it is also possible for the annular concave portion 403 to assume any other desired shape, which enables the sealing tape 10 being produced to have its upper surface shaped into the same desired shape described above.

Now, another embodiment of the method of the present invention for producing the sealing tape 10 will be described.

Figure 6:
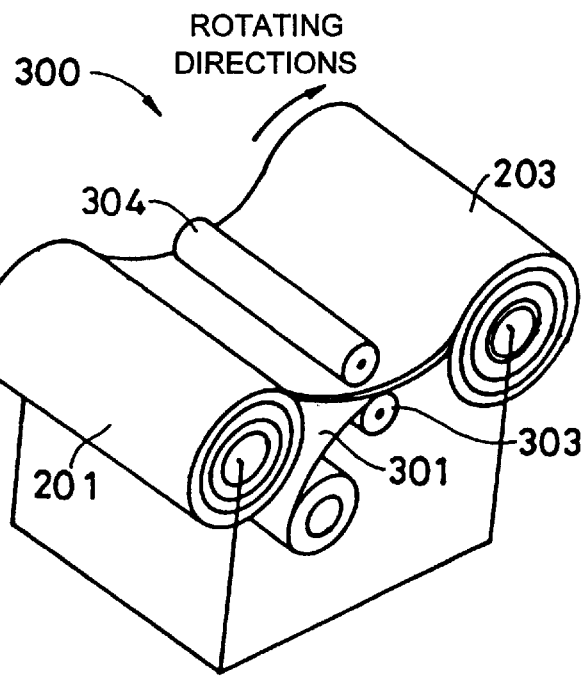
FIG. 6 is a perspective view of a winding process for winding the substantially square-shaped sheet into a rolled sheet.

This another embodiment of the method of the present invention comprises the sealing-tape material preparing step 100, sealing-tape forming step 200 and the adhesive applying step 300 all described above. As shown in FIG. 6, after completion of the adhesive applying step 300, the square-shaped sheet 201 is wound into a roll 203 for storage. By means of a pair of pressure rolls 303, 304, the adhesive sheet 301 is bonded to the square-shaped sheet 201. In other words, the square-shaped sheet 201 is backed with the adhesive sheet 301.

Figure 7:
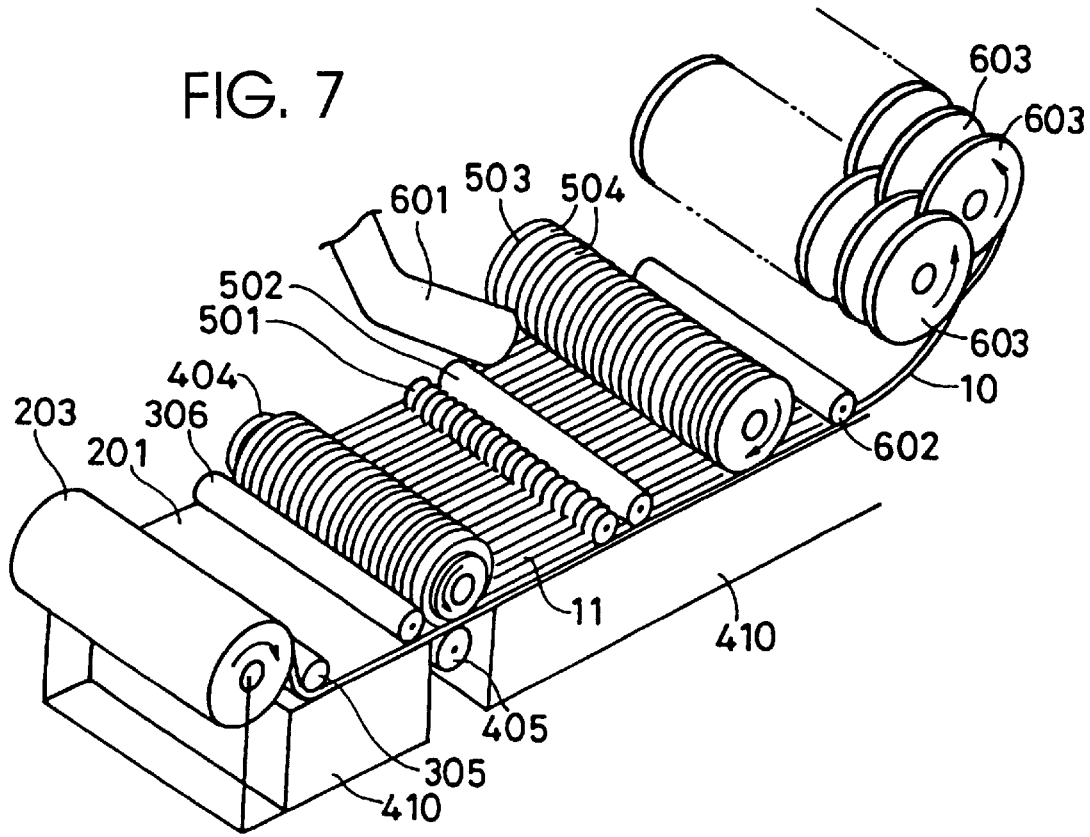
FIG. 7 is a perspective view of another embodiment of the apparatus of the present invention for carrying out the method of the present invention for producing the sealing tape shown in FIG. 1.

After that, as shown in FIG. 7, a leading end portion of the roll 203 (i.e., the rolled square-shaped sheet 201) is pulled rightward to unwind the roll 203, so that the square-shaped sheet 201 thus unwound is spread on the stand 410 flat by means of a pair of holding rolls 305, 306.

Figure 8:
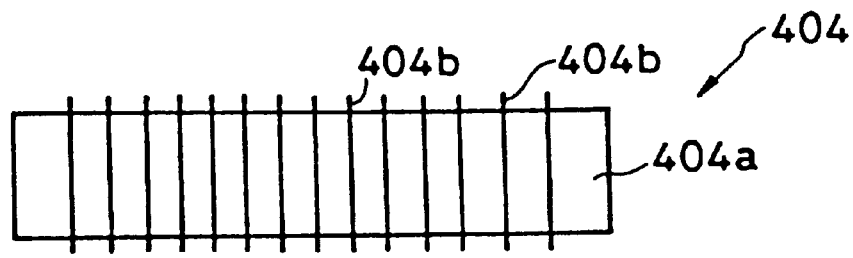
FIG. 8 is a plan view of the roll-type cutter used in the present invention.
Figure 10A:
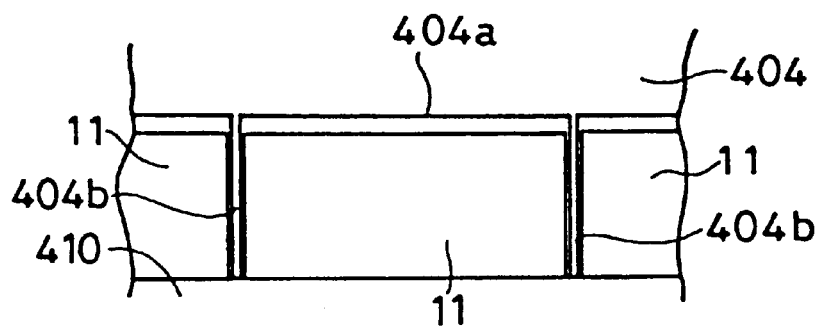
FIG. 10($a$) is a schematic diagram illustrating the substantially square-shaped sheet cutting step conducted in the method of the present invention.

After that, the square-shaped sheet 201 thus flattened travels on the stand 410 rightward and is pinched between the roll-type cutter 404 and a pressure roll 405 oppositely disposed from the cutter 404 as shown in FIG. 7, so that the square-shaped sheet cutting step 400 is realized. As shown in FIG. 8, the roll-type cutter 404 is provided with a cylindrical barrel portion 404a on which fixedly mounted are a plurality of circular blades 404b which are spaced apart from each other at equal intervals. Formed between adjacent ones of the circular blades 404b on the cylindrical barrel portion 404a, is an annular groove or concave portion a depth of which is larger than the thickness of the square-shaped sheet 201. Consequently, when the roll-type cutter 404 is brought into press-contact with the square-shaped sheet 201, the sheet 201 is cut into a plurality of elongated sealing tapes 11 each of which assumes a substantially square shape with a predetermined thickness in cross section, as shown in FIG. 10(a).

Figure 9:
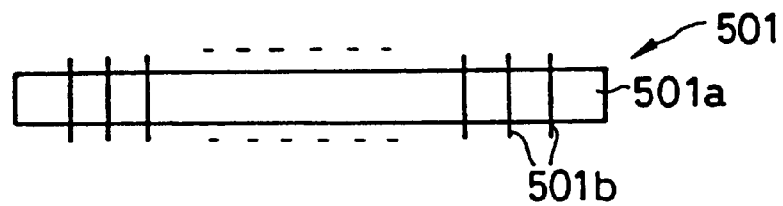
FIG. 9 is a plan view of a guide roll used in the present invention.

Then, the sealing tapes 11 thus obtained are guided and aligned with their traveling paths by means of a guide roll 501 shown in FIG. 9. The guide roll 501 is provided with a cylindrical barrel portion 501a on which a plurality of circular partition members 501b are fixedly mounted in a manner such that they 501b are spaced apart from each other at equal intervals to permit each of the sealing tapes 11 to be received in a space formed between adjacent ones of the circular partition members 501b of the guide roll 501a. A height of the partition member 501b is larger than that (i.e., height or thickness) of the square-shaped sheet 201 or sealing tape 11. A pressure roll 502 following the guide roll 501 is then brought into press-contact with upper surfaces of the sealing tapes 11 to eliminate a difference in height between these tapes 11 on the stand 410.

Figure 10B:
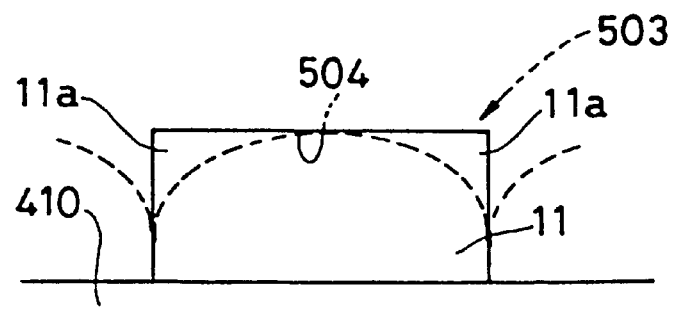

Then, as shown in FIG. 10(b), each of the sealing tapes 11 thus aligned has its upper opposite corner portions 11a trimmed by a roll-type grinder or cutter 503 a rotational speed of which is far larger than the traveling speed of the sealing tapes 11. This grinder or cutter 503 is provided with a cylindrical barrel portion. Formed in an outer peripheral portion of the grinder or cutter 503 are a plurality of annular grooves or concave portions 504 each of which extends in a circumferential direction of the grinder or cutter 503 and has a circularly-curved surface in cross section. Consequently, after completion of the trimming operation conducted by the grinder or cutter 503, the sealing tape 10 having a circularly-curved upper surface in cross section is obtained, as shown in FIG. 1 or in dotted lines in FIG. 10(b). The grinder or cutter 503 may have the surface of each of its annular groove or concave portions 504 constructed of a filing means, and assume the same shape as that of the roll-type cutter shown in FIG. 4, except that the depth of the groove or concave portion 504 is equal to the height of the sealing tape 11.

On the other hand, a vacuum conduit 601 is located directly upstream of the roll-type grinder or cutter 503 to suck up dust and tape filings removed by the grinder or cutter 503. A press roll 602 is located directly downstream of the roll-type grinder or cutter 503 to eliminate a difference in height between the sealing tapes 11. After that, each of the sealing tapes 11 passed through the press roll 602 is wound on a take-up roll 603 which is rotatably mounted on the stand 410.

In this embodiment of the present invention, the roll-type grinder or cutter 503 is rotated clockwise, i.e., in a direction opposite to the traveling direction of the sealing tapes 11, as viewed in FIG. 7. However, it is also possible for the grinder or cutter 503 to rotate counterclockwise, provided that the rotational speed of the grinder or cutter 503 is far larger than the traveling speed of the sealing tapes 11.

Now, a method of repairs with the sealing tape 10 thus obtained according to the present invention will be described.

When a car body panel is damaged, it is necessary to repair such damaged panel. In this repair, a sheet metal repair is first conducted. After that, according to the present invention, the sealing tape 10 (shown in FIG. 1) is cut into a piece having a desired length. The adhesive layer 3 of the bottom surface 1 of The thus obtained piece of the sealing tape 10 with the desired length (hereinafter simply referred to as the sealing tape) is then applied to a joint portion between metal plates while peeled from its protective sheet 4 (shown in FIG. 1), so that the joint portion of the metal plates is covered with and bonded to the sealing tape 10.

More specifically, in the joint portion, one of the metal plates has its surface abut on a surface of the other. Consequently, when the sealing tape 10 is applied and bonded to one of the metal plates in the joint portion, it is possible to prevent water and dust from entering the interior of the joint portion. As described above, the sealing tape 10 of the present invention is capable of hermetically sealing the joint portion of the metal plate.

Since the sealing tape 10 is in the unvulcanized state or condition and therefore capable of being molded into any desired shape, it is also possible to bend the sealing tape 10 when the tape 10 is applied to the joint portion of the metal plates.

After completion of the application of the sealing tape 10 to the joint portion of the metal plate, a body color paint is applied to the joint portion, wherein: the paint is sprayed on the joint portion to form a paint layer thereon; and, thereafter, a forced heating process for stabilizing the paint layer thus applied is conducted in a spray booth at a temperature of approximately 70 degrees centigrade for at least half an hour. Consequently, it is possible to vulcanize the sealing tape 10 in the forced heating process. After completion of the forced heating process, the sealing tape 10 having been vulcanized is capable of resiliently keeping its final shape constant even when subjected to an external force.

Since the sealing tape 10 is in the unvulcanized condition, the sealing tape 10 is capable of being bonded to any desired object and being freely varied in shape. Even when the sealing tape 10 is bent to a desired shape along the joint portion of the metal plates, there is no fear that the thus bent portion of the sealing tape 10 slacks or separates from the joint portion of the metal plates.

Further, at this time, the bottom surface 1 (which is coated with the adhesive layer 3) of the sealing tape 10 is varied in shape when pressed against the joint portion of the metal plates, which enables the adhesive layer 3 bonded to the bottom surface 1 of the sealing tape 10 to fit the joint portion of the metal plates. Consequently, even when the joint portion of the metal plates is constructed of a stepped surface, it is also possible for the sealing tape 10 of the present invention to fit such stepped joint surface of the joint portion.

After completion of the application of the sealing tape 10 to the joint portion of the metal plates, the sealing tape 10 applied to the joint portion is subjected to a painting process, in which the sealing tape 10 is painted and then heated, and, therefore vulcanized, whereby the thus vulcanized sealing tape 10 is capable of resiliently keeping its bent shape constant.

Therefore, the method of repairs of the present invention may eliminates a conventional vulcanization step, because the conventional painting process is accompanied with its own heating step which enables the sealing tape 10 to be vulcanized.

Figure 11:
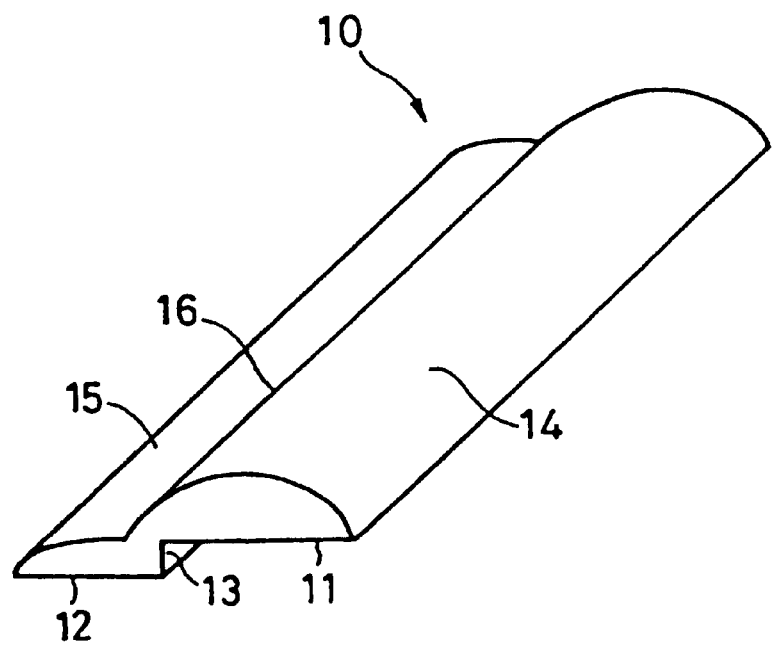
FIG. 11 is a perspective view of another embodiment of the sealing tape of the present invention.
Figure 12:
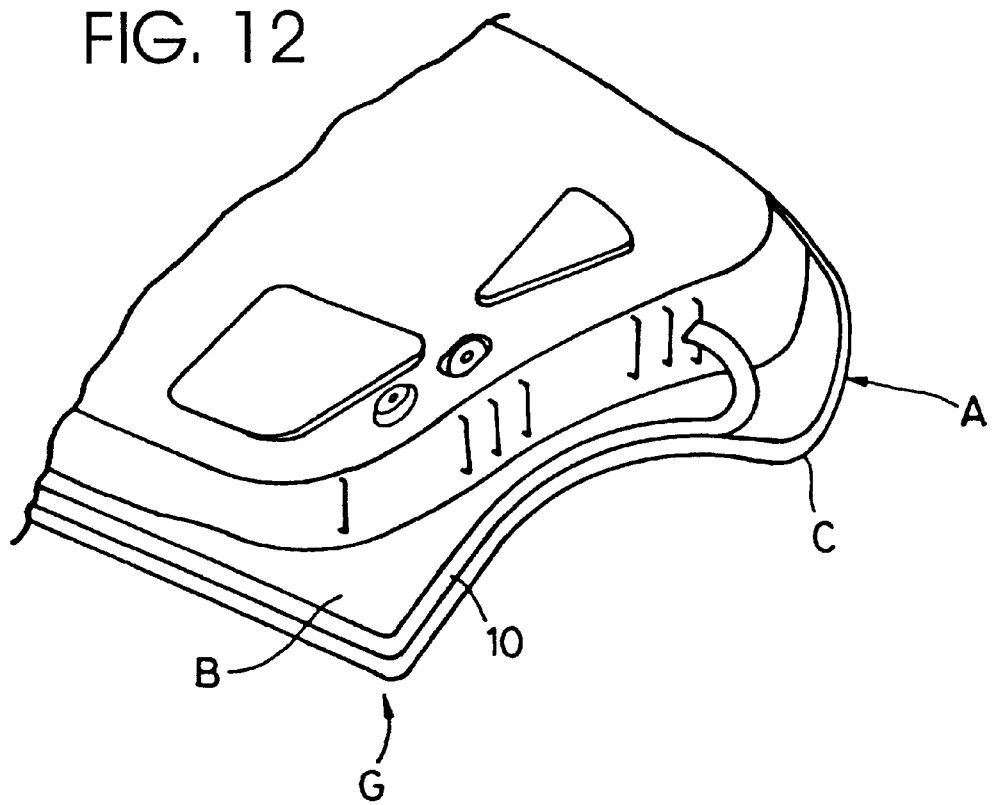
FIG. 12 is a perspective view of the inside of a door, illustrating the sealing tape applied to a joint shoulder portion of metal plates in the door.

FIG. 11 is another embodiment of the sealing tape 10 of the present invention. The sealing tape 10 shown in FIG. 11 is made of the same sealing-tape material as that of the sealing tape 10 shown in FIG. 1. The big difference between these sealing tapes 10 is that the former shown in FIG. 11 has a stepped bottom surface while the latter has a flat bottom surface 1. Incidentally, in the embodiment of the sealing tape 10 shown in FIG. 11, both an adhesive layer and a protective sheet corresponding to those 3 and 4 shown in FIG. 1 are omitted to perspicuity.

More particularly, the stepped bottom surface of the sealing tape 10 shown in FIG. 11 is constructed of: a first flat bottom surface 11; a second flat bottom surface 12, which is lower than the first flat bottom surface 11; and, a connecting surface 13 therebetween, The connecting surface 13 extends in a direction perpendicular to the bottom surfaces 11, 12 therebetween.

As is clear from FIG. 11, the sealing tape 10 has: an upper circularly-curved convex surface 14, which is oppositely disposed from the first flat bottom surface 11; a flange surface 15, which is oppositely disposed from the second flat bottom surface 12; and, a root portion 16, which is disposed between the convex surface 14 and the flange surface 15 to extend along the entire length of the sealing tape 10.

Figure 13:
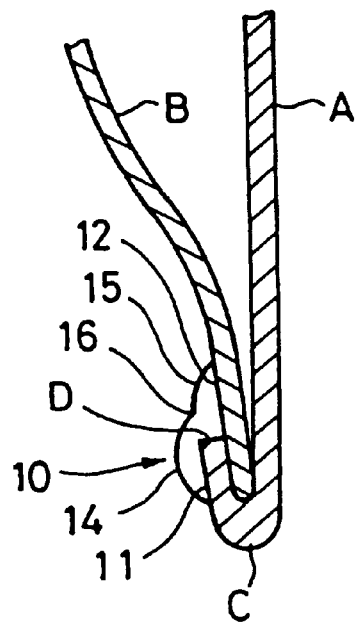
FIG. 13 is a cross-sectional view of the joint shoulder portion of the metal plates, to which portion the sealing tape has been applied.

The stepped bottom surface of the sealing tape 10 having the above construction facilitates application of this sealing tape 10 to a stepped joint portion formed between the metal plates. For example, as shown in FIG. 13, a second metal plate B has its edge portion fitted in a bent end portion C of a first metal plate "A", so that a stepped joint portion D is formed therebetween. When the joint portion D is coated lengthwise with the sealing tape 10 shown in FIG. 11, this sealing tape 10 is applied to the joint portion D in a manner such that: the first flat bottom surface 11 oppositely disposed from the convex surface 14 of the sealing tape 10 is bonded to the metal plate "A"; and, the second flat bottom surface 12 oppositely disposed from the flange surface 15 of the sealing tape 10 is bonded to the metal plate B.

Consequently, the sealing tape 10 may have its bottom surfaces 11, 12 and connecting surface 13 therebetween perfectly fit the stepped joint portion D of the metal plates "A", B without fail, whereby the joint portion D is hermetically sealed.

EXAMPLE

Now, an example of the sealing tape 10, 11 of the present invention will be described.

Mixed in the hopper 101 at a temperature of approximately 50 degrees centigrade to prepare the sealing-tape material were: a 40 parts by weight of the unvulcanized rubber-base material; a 10 parts by weight of the sulfur oxides as the vulcanization accelerator; a 12 parts by weight of polybutene as the anti-oxidizing agent; a 10 parts by weight of titanium oxides as the pigment; and, a 28 parts by weight of calcium carbonate as the bulk filler.

Namely, the composition of the sealing-tape material is shown in the following Table 1:

(TABLE 1)

| | |
|---|---|
| rubber-base material | 40 parts by weight |
| sulfur oxides | 10 parts by weight |
| polybutene | 12 parts by weight |
| titanium oxides | 10 parts by weight |
| calcium carbonate | 28 parts by weight |

As shown in FIG. 2, the sealing-tape material thus prepared was then formed into the substantially square-shaped sheet 201 having a length of 12 centimeters in the forming step 200. Immediately after completion of this forming step 200, the square-shaped sheet 201 was backed with the adhesive sheet 301 coated with an adhesive. After that, the square-shaped sheet 201 was cut into a plurality of sealing tapes 10 at a temperature of approximately 40 degrees centigrade at a time by means of the roll-type cutter 401 on the stand 410.

The thus obtained unvulcanized sealing tape 10 was applied to a bent joint portion formed between metal plates. After application of the sealing tape 10 to the bent joint portion, any slack or any separation of the sealing tape 10 was not found in such bent joint portion of the metal plates. Then, a painting process was conducted, in which the sealing tape 10 applied to the bent joint portion of the metal plates was subjected to a heating process, and, therefore vulcanized. After that, the sealing tape 10 thus vulcanized was found to be capable of resiliently keeping its fixed shape bent along the bent joint portion of the metal plates.

In the unvulcanized sealing tape 10 of the present invention, due to its unvulcanized condition, the sealing tape 10 is capable of being bonded to any object and also capable of varying its shape so as to fit any object's shape, which eliminate any fear of slack and separation of the sealing tape 10 applied to the object. Consequently, it is possible to apply the sealing tape 10, 11 of the present invention to any object in an easy manner, which improves the sealing tape 10, 11 of the present invention applied to the object in appearance in finishing.

In the method of the present invention for producing the sealing tape 10, 11, since the square-shaped sheet 201 is continuously cut by the roll-type cutter 401 while traveling on the stand 410, it is possible to obtain the elongated unvulcanized sealing tapes 10, 11.

Due to the annular grooves or concave portions 403 of the cutter 401, it is possible to have the upper surface of the sealing tape 10, 11 of the present invention formed into a circularly-curved convex shape or barrel-roof like shape in cross section, which enables the sealing tape 10, 11 to be well adapted to its use.

In the method of the present invention for repairs, the sealing tape 10, 11 is bent while applied to the joint portion of the metal plates. After that, the sealing tape 10, 11 of the present invention applied to the joint portion is subjected to the painting process, in which the sealing tape 10, 11 is heated, and, therefore vulcanized. Consequently, the thus vulcanized sealing tape 10, 11 of the present invention is capable of resiliently keeping its fixed shape formed when applied to the joint portion of the metal plates in repairs. Due to the above painting process accompanied with the heating step, it is possible for the method of repairs of the present invention to eliminate a conventional independent vulcanization process.

What is claimed is:

1. In an elongated sealing tape for repairing a deformed joint of car body panels so as to have said deformed joint return to an original shape as that of a new car, said joint being disposed between a pair of metal surfaces or metal plates inside said car body panels, said sealing tape being applied to said joint after completion of a repair in shape of said joint, the improvement comprising:

said sealing tape containing a rubber-base material and its vulcanization accelerator so as to be capable of being bent at substantially right angles when said sealing tape is applied to said joint; and in a condition in which said sealing tape is still not vulcanized, said sealing tape having a predetermined thickness in a direction perpendicular to a bottom surface, and having a curved surface in an upper surface.

2. The sealing tape as set forth in claim 1, wherein:

added to said unvulcanized rubber-base material together with said vulcanization accelerator is an anti-oxidizing agent.

3. The sealing tape as set forth in claim 1, wherein:

an adhesive is applied to said bottom surface of said sealing tape.

4. The sealing tape as set forth in claim 1, wherein:

said bottom surface is a stepped surface.

* * * * *